United States Patent Office 3,412,612
Patented Nov. 26, 1968

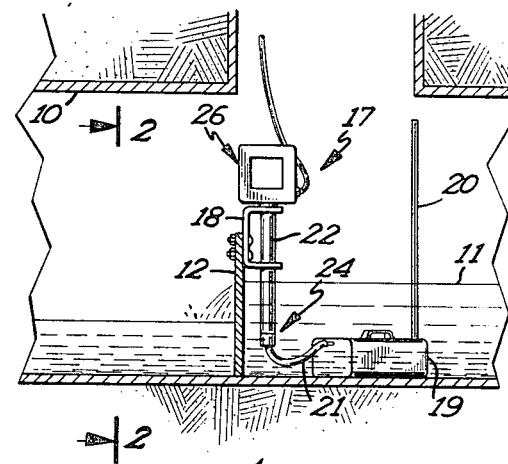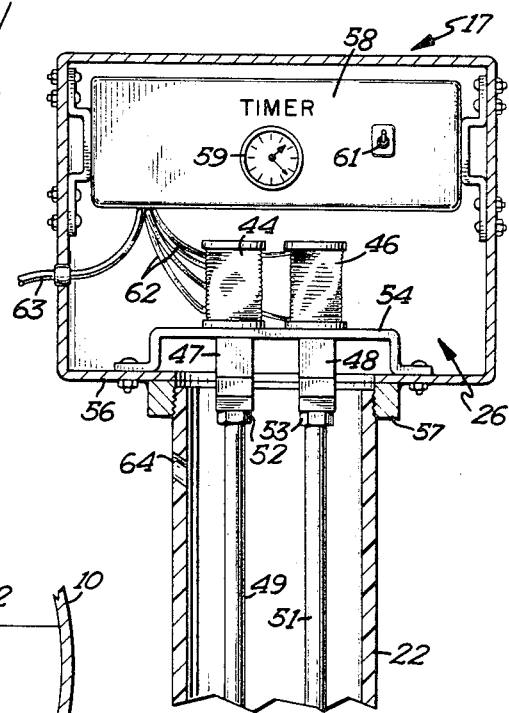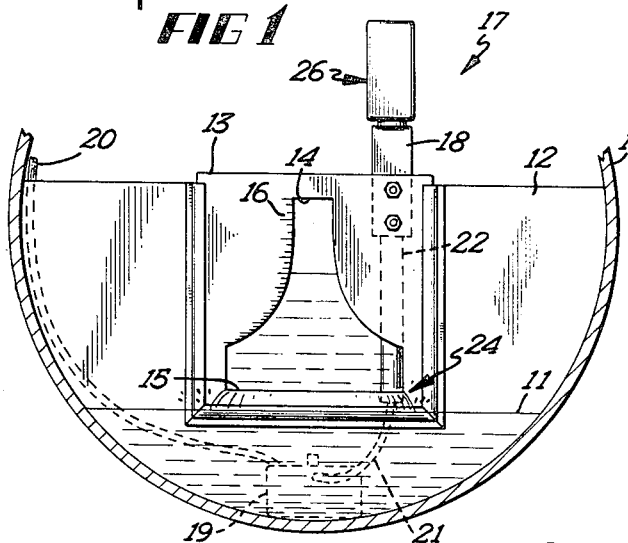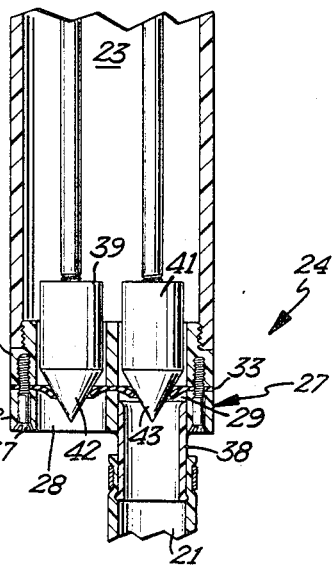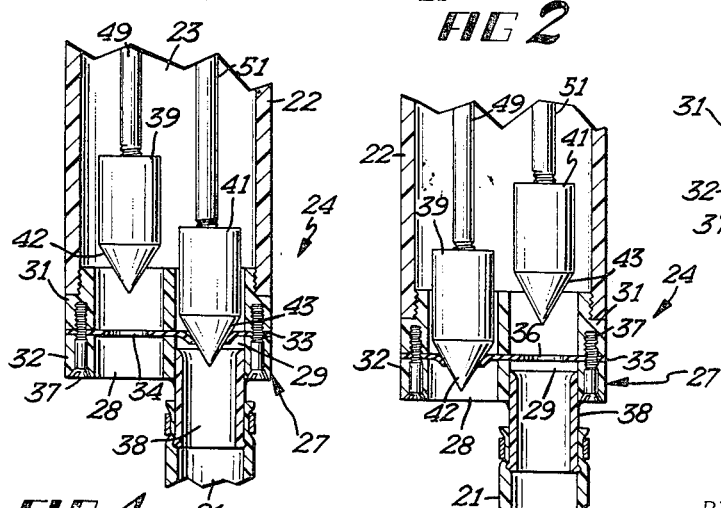

3,412,612
COMPOSITE SAMPLER
Roman R. Carr, 4125 Upton Ave. S.,
Minneapolis, Minn. 55410
Filed Oct. 24, 1966, Ser. No. 588,868
13 Claims. (Cl. 73—421)

ABSTRACT OF THE DISCLOSURE

An automatic composite sampler attached to the upstream side of a proportional weir. The sampler has inlet and outlet valves selectively operable to collect, trap and discharge a sample of liquid. The valves are periodically and sequentially operated by separate solenoids controlled by a timer.

---

This invention relates to an apparatus for sampling fluid material and more particularly to an automatic liquid sampler usable with water, sewage, and industrial wastes.

Briefly described, the liquid sampler of this invention is an automatic device for sampling a liquid flowing in an open channel in proportion to flow as well as to measure the flow rate. This is accomplished by using a liquid sampler in combination with a proportional weir. In use, the sampling device operates in conjunction with the weir to take a sample which is proportional to the flow through the weir.

The liquid sampler comprises an upright tubular member having a valve body at the lower end of the tubular member containing an inlet opening and an outlet opening. Inlet ad outlet valves cooperate with the valve body to selectively open and close the inlet and outlet openings to collect a sample, trap the collected sample, and then discharge the collected sample into a separate container. Each valve consists of a conically shaped plunger which cooperates with an opening in a flexible diaphragm carried by the valve body to open and close the inlet and outlet openings. The valves are operated by a control means at sequentially controlled timed intervals whereby a number of samples of fluid are collected in the tubular member and are discharged into the storage container. The number of samples taken over a period of time is controlled with an adjustable timer which is part of the control means. With the timer set, the liquid sampler automatically operates to take samples at controlled timed intervals.

The automatic sampling device is simple and practical in construction, reliable and durable in operation, small and compact in structure making it portable, inexpensive to manufacture and is readily installed for use to collect samples of liquid material, as water, sewage, industrial waste, and the like.

In the drawings:

FIGURE 1 is a sectional view of a sewer line having a weir measuring the rate of flow of liquid and an automatic sampler for taking periodic samples of the liquid flowing in the sewer line;

FIGURE 2 is an enlarged sectional view taken along the line 2—2 of FIGURE 1;

FIGURE 3 is a foreshortened vertical sectional view of the automatic sampler of FIGURE 1 showing both inlet and outlet valves in their closed positions;

FIGURE 4 is a vertical sectional view of the valve mechanism of the sampler showing the inlet valve open and outlet valve closed; and FIGURE 5 is a view similar to FIGURE 4 showing the inlet valve closed and outlet valve open.

Referring to the drawings, there is shown in FIGURES 1 and 2, a horizontal sewer line 10 carrying a stream of liquid 11 as sewage industrial waste and the like. Extended transversely across the bottom of sewer line 10 is an upright dam 12 having a removable proportional weir 13 commonly called a Sutro weir. As shown in FIGURE 2, weir 13 has an opening 14 of a generally inverted T-shape. The bottom portion of the opening is rectangular and has a horizontal transverse edge 15. Above the rectangular bottom portion, the width of opening 14 becomes smaller with the elevation so that the same amount of liquid flows through opening 14 in each increment of elevation. Weir 13 has calibrated indicia 16 along one edge of opening 14 whereby the rate of flow of liquid through the weir opening can be determined.

Located adjacent the upstream side of dam 12 is a liquid sampler indicated generally at 17. A U-shaped bracket 18 secures the sampler to weir 13 with a portion of the sampler directed downwardly into the liquid adjacent one side of opening 14. A tank or container 19 for storing the samples of liquid from sampler 17 rests on the bottom of sewer line 10 adjacent the sampler. A vent hose 20 connects the inside of container 19 with the atmosphere so that the sample of liquid freely flows by gravity into the container. A second hose 21 connects the container with the bottom end of the sampler.

Referring to FIGURE 3, sampler 17 comprises an upright tubular member 22 having an upright sample chamber 23. Member 22 may be a plastic cylinder, metal pipe or similar elongated tubular member. A valve mechanism indicated generally at 24 is attached to the lower end of tubular member 22. A control indicated generally at 26 is attached at the opposite or upper end of tubular member 22. Valve mechanism 24 operated by control 26 sequentially controls at predetermined time intervals the operation of the valve mechanism whereby separate samples of liquid are collected in sample chamber 23 and discharged from the sample chamber into container 19.

Valve mechanism 24 comprises a valve body indicated generally at 27 secured to the lower end of tubular member 22. Body 27 has an upright inlet passage 28 and an upright outlet passage 29 and is a two-piece assembly formed from an upper disc member 31 and a lower disc member 32. Member 31 is threaded into the bottom end of tubular member 22 to secure valve mechanism 24 to member 22. A separate collar may be used to attach the valve body to the tubular member. Members 31 and 32 located in face-to-face relationship are clamped about a flat flexible diaphragm 33, made of rubber, plastic or similar material, having a circular inlet opening 34 aligned with inlet passage 28 and a circular outlet opening 36 aligned with outlet passage 29. Fasteners 37, as bolts, screws, and the like, project upwardly through lower member 32 and are threaded into upper member 31 clamping members 31 and 32 together. Projected into the lower portion of passage 29 is a coupling 38 having a nipple for hose 21 which leads to container 19.

An inlet valving member 39 and an outlet valving member 41 cooperate with valve body 27 to sequentially open and close openings 34 and 36 in the diaphragm 33 allowing liquid to initially flow up into sample chamber 23 and then trapping the liquid in the chamber and finally permitting the liquid trapped in the sample chamber to drain into hose 21 which carries the liquid to container 19. Valving members 39 and 41 are elongated cylindrical plungers projected downwardly into the passageways 28 and 29 respectively. The lower ends 42 and 43 of valving members 39 and 41 are cone-shaped and converge downwardly to center points. The cone-shape of the lower ends of the valving members enables a portion of these ends to project through circular openings 34 and 36 and bend the flexible diaphragm providing annular surface engagement between the closed valving members and the diaphragm. This valve structure forms a positive seal even in the presence of particulate matter.

Valving members 39 and 41 are moved to open and closed positions by solenoids 44 and 46 which are part of control 26. Solenoid 44 has a core or plunger 47 connected to a rod 49 threaded into the upper end of valving member 39. A similar core or plunger 48 associated with solenoid 46 is secured to an elongated rod 51 threaded into the upper end of valving member 41. The upper ends of rods 49 and 51 are threaded into the associated cores of the plungers whereby the positions of the valving members 39 and 41 relative to the flexible diaphragm may be adjusted to insure the proper opening and closing of the valving members. Lock nuts 52 and 53 threaded on the rods 49 and 51 hold the rods in their adjusted positions. Sleeves may be adjustably secured to the rods to change the length of the rods thereby adjusting the positions of the valving members 39 and 41 relative to the diaphragm. The sleeves can be used to limit the downward strokes of the rods carrying the valving members 39 and 41.

Solenoids 44 and 46 are carried on a support 54 located within a housing 56. The lower wall of the housing has an opening surrounded by a ring or downwardly projected flange 57 used to attach the upper end of tubular member 22 to the housing and provide an opening between the housing and the tubular member. A timer 58 mounted within housing 26 above the solenoids is electrically coupled to solenoids 44 and 46 with lines 62. A source of electrical power (not shown) connected to a line 63 runs through housing 56 to timer 58.

Timer 58 may be a clock type device, as a spring driven clock, having movable conducting arms which sequentially engage contacts electrically coupled to the valve operating solenoids connecting the solenoids with a power source, as a battery. Timer 58 may be a motor operating a plurality of cams operable to open and close switches or any type of timing unit capable of sequentially operating at predetermined time intervals solenoids 44 and 46. Timer 58 is shown as having a manual set control 59 and an on-off switch 61 telling whereby the timer can be set to automatically operate at predetermined intervals, for example, every one-eighth hour, every quarter hour or every half hour and the like.

In the installation shown in FIGURE 1, liquid sampler 17 is located in a horizontal sewer line and operated from an external source of electric power. Sampler 17 may include a self-contained battery which operates the timer and energizes solenoid 44 and 46. In addition, a flotation collar may be attached to the sampler making it usable in fresh water situations as lakes, rivers and the like.

In use with proportional weir 13, sampler 17 is attached to the weir with bracket 18. This positions sampler 17 on the upstream side of the weir so that valve openings 34 and 36 in valve mechanism 24 are in horizontal alignment with the bottom edge 15 of the weir opening. This provides a direct ratio between the head of water flowing through the weir opening 14 and the amount or volume of the sample collected in sample chamber 23 of the upright tubular member 22. The volume of valving members 39 and 41 and volume of upper member 31 are calculated to compensate for the reduced flow rate of liquid flowing through the bottom rectangular portion of the weir opening. This makes the entire sample collected in chamber 23 proportional to the rate of flow of liquid through the weir. The average flow rate is calculated by dividing the total volume collected by the number of samples taken in the sampling period, converting this figure to average height in chamber 23 and reading from a conversion chart for each weir.

With the timer 58 coupled to a source of electric power and set to operate, a sampling cycle is commenced by energizing solenoid 44 moving core 47 in an upward direction carrying valving member 39 to an open position as shown in FIGURE 4. Since the lower end of tubular member 22 is located below the surface of the liquid, liquid will flow upwardly through inlet passage 28 into sample chamber 23 until the level of the liquid in the chamber 23 is equal to the level of the liquid on the upstream side of the weir. Air in chamber 23 is vented through hole 64 in the upper portion of tubular member 22. Liquid can be introduced into chamber 23 through hole 64 to check and demonstrate the calibration of the bottom portion of chamber 23. The relationship of the inlet opening 34 relative to the bottom edge 15 of weir 13 makes the sample collected in the chamber 23 proportional to the rate of flow of liquid in sewer line 10. After a short period of time has elapsed, solenoid 44 is de-energized whereby valving member 39 quickly drops downwardly closing inlet opening 34 thereby trapping the sample of liquid in chamber 23.

The trapped sample is drained by gravity from chamber 23 by opening valving member 41. This is accomplished by energizing solenoid 46 moving core 48 and rod 51 in an upward direction carrying valving member 41 to the open position as shown in FIGURE 5. The sample drains through outlet passage 29 into hose 21 connected to container 19. Air in container 19 is vented through hose 20. The gravity inlet and discharge movements of the liquid to and from sample chamber 23 prevents plugging and jamming of the valving mechanism. When the sample is drained from the chamber 23, the sampling cycle is completed by de-energizing solenoid 46 whereby valving element 41 moves downwardly in sealing relationship with flexible diaphragm 33.

In operation, solenoids 44 and 46 cause the valving members 39 and 41 to open and close in a sudden manner so that there is no filtration of the sample. This assures that the sample is a representative of the material being sampled.

In summary, sampler 17 operates to automatically draw at preselected intervals a sample of liquid and discharge this sample into a container 19. The automatic operation of timer 58 permits a full day's sampling to be done automatically in an unattended remote area.

It is apparent that many modifications and variations of this invention as hereinbefore set forth may be made by one skilled in the art without departing from the spirit and scope of the invention. The specific embodiment described and shown in the drawings is given by way of example only and the invention is to be limited only by the terms of the appended claims.

The embodiments of the invention in which an exclusive property or privilege is claimed are defined as follows:

1. A liquid sampler comprising, a member having a chamber for collecting a sample of liquid, a valve mechanism secured to the lower end of the member, said valve mechanism having an inlet passage and an outlet passage opened to said chamber, flexible means having an inlet opening and an outlet opening aligned with the inlet and outlet passages respectively, and inlet and outlet valve means cooperating with the flexible means to selectively open and close said inlet and outlet openings, control means connected to said inlet and outlet valve means operable to open said inlet valve means thereby allowing a sample of liquid into the chamber when the lower end of the chamber extends into a body of liquid and then closing said inlet valve means to trap said sample of liquid in the chamber and to open said outlet valve means to discharge the sample of liquid from said chamber.

2. The liquid sampler of claim 3 including a container means coupled to the body to receive the sample of liquid discharged from the tubular means.

3. A liquid sampler comprising an upright tubular means, a body attached to the bottom of the tubular means, said body having an upright inlet passage and an upright outlet passage, diaphragm means secured to said body, said diaphragm means having an inlet opening and an outlet opening aligned with the inlet and outlet passages respectively, inlet valve means and outlet valve means cooperating with said diaphragm means to selectively open and close said inlet and outlet openings, control means connected to said inlet and outlet valve means operable to open said inlet valve means thereby allowing a sample of liquid into the tubular means when the lower end of the tubular means extends into the body of liquid and then closing said inlet valve means to trap said sample of liquid in the tubular means and to open said outlet valve means to discharge the sample of liquid from said tubular means.

4. The liquid sampler of claim 3 wherein said body comprises two members with the diaphragm means sandwiched between the members.

5. The liquid sampler of claim 3 wherein said inlet and outlet valve means each comprise an elongated member having a cone-shaped nose cooperating with the diaphragm to close one of the openings therein.

6. The liquid sampler of claim 5 including adjustable means connecting each elongated member with control means whereby the positions of the elongated members relative to the diaphragm means may be changed.

7. The liquid sampler of claim 3 wherein said control means includes solenoid means connected to the inlet and outlet valve means and timer means operable to periodically and sequentially operate said solenoid means whereby the inlet and outlet valve means are sequentially opened and closed.

8. The liquid sampler of claim 3 in combination with a proportional weir having a discharge opening, said inlet opening and said outlet opening being located in horizontal alignment with the bottom of the opening in the weir.

9. The combination of structure defined in claim 8 including means securing the sampler to a portion of the weir.

10. The liquid sampler of claim 3 wherein said control means includes timer means operable to periodically and sequentially open and close said inlet and outlet valve means.

11. In combination: a proportional weir having an inverted generally T-shaped discharge opening with a horizontal bottom edge allowing the same amount of liquid to flow through the weir in each increment of elevation, a liquid sampler located on the upstream side of the weir, said sampler having an upright compartment and a valve mechanism in horizontal alignment with the bottom edge, said valve mechanism including a diaphragm means having an opening and a valve means selectively movable to open and closed positions relative to the diaphragm means to collect a sample of liquid in the compartment, said valve means having a volume to compensate for the reduced flow rate of liquid flowing through the bottom portion of the weir whereby said sample is substantially proportional to rate of liquid through the weir opening.

12. In a liquid sampler: a member having an upright compartment for collecting a sample of liquid, a valve mechanism secured to the lower end of the member, said valve mechanism including a passage open to the compartment and outside of the member, diaphragm means having an opening aligned with the passage, and valve means cooperating with said diaphragm means to open and close said opening; and control means connected to said valve means operable to open said valve means to allow a sample of liquid into the compartment when the lower end of the compartment extends into a body of liquid and then close said valve means to trap said sample of liquid in the compartment.

13. The liquid sampler of claim 12 including additional valve means cooperating with diaphragm means, and further control means for moving the additional valve means to open and closed positions relative to the cooperating diaphragm means.

References Cited
UNITED STATES PATENTS

| 1,975,710 | 10/1934 | Borden | 73—215 |
| 2,270,511 | 1/1942 | Crain | 73—421 |
| 3,310,984 | 3/1967 | Swanson | 73—421 |

FOREIGN PATENTS

| 1,175,015 | 2/1958 | Germany. |

S. CLEMENT SWISHER, *Primary Examiner.*

J. W. ROSKOS, *Assistant Examiner.*